3,184,316
METHOD FOR PRODUCING A CANDY COATED MIXTURE OF NUT MEATS AND PUFFED CEREAL PARTICLES

Charles A. Doan and Winfred D. Lepley, Battle Creek, Mich., assignors to Kellogg Company, Battle Creek, Mich., a corporation of Delaware
No Drawing. Filed May 13, 1963, Ser. No. 280,140
5 Claims. (Cl. 99—83)

This invention relates to cereal compositions and particularly to mixtures of relatively low-density, porous, explosively puffed cereals or cereal doughs with relatively high-density, whole or broken shelled nut meats (which will hereafter be referred to as nuts).

It is an object of the present invention to provide a candy coated mixture of puffed cereals and nuts as aforesaid characterized by substantial freedom from segregation of these components of sharply differing densities, whereby to provide bodies or mixtures of the aforesaid components wherein the nuts adhere to the cereals instead of separating as might be the case absent the process of the present invention.

The employment of conventional hard candy coatings composed principally of sucrose, such as are employed for coating puffed cereals to provide them with hard, non-tacky substantially transparent coatings, do not readily adhere to nuts, such as for example, plain roasted peanuts, and such uncoated nuts segregate rapidly when mixed with candy coated cereals.

We have found in accordance with the present invention that the nuts may be caused to readily adhere to the puffed cereals by pre-coating the nuts with a relatively small amount of a mutual binder. After such pre-coating of the nuts, the requisite amount of nuts and puffed cereals can be mixed and jointly coated with a heated aqueous syrup. The pre-coated nuts are then found to become readily coated with the syrup, which on cooling hardens to a candy coating, and to concomitantly become adhered to the cereals to produce an end product wherein the nuts tend to move with the cereal instead of separating, so that the end product is a substantially homogeneous and stable mixture.

It will be understood that in the practice of the present invention not only can peanuts be employed but other nuts such as cashew nuts, filberts, pecans, almonds, walnuts, and the like smooth-bodied shelled nut meats, either whole or broken, and of course their mixtures.

The cereals employed are those of conventional ready-to-eat breakfast cereal type, such as puffed wheat, puffed rice, or shaped particles of dough composed of corn or mixtures of corn and wheat, which have been subjected to conventional gun or explosive puffing to provide porous relatively low-density crisp bodies or particles.

The mutual binders of the present invention are edible gum-like materials sometimes also termed emulsifiers. The gums which can be employed as mutual binders are edible gums such as acacia, karaya, locust bean, ghatti, tragacanth, and carrageenin (a gelatinous extract of seaweed called carrageen).

Also suitable are polyhydroxy esters of fatty acids known in the cereal baking industry as "emulsifying agents" including mono and diglycerides, lactylated mono and diglycerides, lecithin, hydroxylated lecithin, polyoxysorbitan monostearate, polyoxyethylene stearate, sorbitan monostearate, sorbitan monooleate, and polyglycerol oleate, and the like edible emulsifying materials.

In carrying out the process of the present invention, the nuts to be employed are separated with a solution of the mutual binder which in the case of the aforesaid gums can be water and in the case of the emulsifiers can be ethyl alcohol, followed by drying to remove the solvent.

The desired amounts of coated nuts and puffed cereal are then introduced into a mixing vessel and heated syrup added thereto, with continued mixing until all the components have become mutually well distributed or mixed, following which the mixture is cooled and clusters broken up and screened ready for packaging.

Thus, in one specific example of the present invention a 120 gram portion of shelled small red screened Spanish peanuts were sprayed with 6.25 ml. of a solution of polyglycerol oleate in ethyl alcohol containing 1 gram of the oleate per 2.5 ml. of solution. The peanuts were allowed to set for about 30 to 35 minutes during which time the alcohol evaporated leaving a deposit of the mutual binder or emulsifier on the nuts of about 2% by weight of the nuts.

These coated peanuts were then mixed with 180 grams of puffed wheat, which had been dried immediately prior thereto at a temperature of about 230° F., in a mixing drum heated to a temperature of about 315° F. To this mixture of puffed wheat and coated peanuts in the mixing vessel was added in a period of 15 seconds a syrup heated to a temperature of 315° F., composed of the following:

| | |
|---|---|
| Sucrose _____grams__ | 551 |
| Corn Syrup (43° Bé.) _____do____ | 87 |
| Honey _____do____ | 2 |
| Sodium acetate _____do____ | 0.75 |
| Glycine _____do____ | 0.3 |
| Water _____ml__ | 170 |

The mix was then stirred and rotated for another 15 seconds after which a 30 ml. portion of melted hydrogenated peanut oil flakes was sprayed onto the mixture in the drum to prevent large clusters from forming. The coating mixture was then promptly discharged and placed on a ⅝" screen over a cooling fan for one minute. The remaining clusters were then broken up and screened as the material cooled.

In another specific example, a 120 gram portion of peanuts was sprayed with 20 ml. of a solution of gum acacia in water containing 1 gram of acacia per 8 ml. of water. The acacia sprayed on was 2% by weight of the peanuts. The sprayed peanuts were dried on a vat at a temperature of 230° F. for about 5 minutes to evaporate the solvent following which the peanuts were mixed with heated and dried gun puffed wheat, and then candy coated as described in the preceding example.

Although in the foregoing examples the binder is shown to be approximately 2% by weight of the nuts, smaller amounts of binder can be employed with good results. For example, good results have been obtained employing as low as 0.21% of locust bean gum by weight of the nuts and even with as low as 0.17% by weight of carrageenin by weight of the nuts.

As previously indicated, a mixture of puffed cereals may be employed. In the alternative a single type of cereal such as puffed wheat in admixture with nuts pre-coated with the mutual binder may first be formed, following which there may be admixed therewith another cereal such as for example a puffed corn dough particle composition which has been separately provided with a candy or sugar coating.

Thus, for example, a suitable mixture was prepared composed of 37.5% by weight of puffed wheat, 37.5% by weight of puffed corn dough particles, and 25% by weight of peanuts pre-coated in accordance with the present invention. The peanuts and puffed wheat were first mixed together and coated with the syrup providing container. However, little tendency for segregation was mixed with separately prepared candy-coated puffed corn dough composition particles.

Samples of mixtures formed in accordance with the present invention were subjected to shaking for several minutes in a transparent receptacle to determine whether or not the nuts would segregate in any one spot in the container. However, little tendency for sergegation was found. On the contrary, the composite formed in accordance with the present invention remained of substantially homogeneous character.

We claim:
1. The method of forming a candy coated susbtantially non-segregating mixture of nut meats and puffed cereal particles which comprises pre-coating the nuts with an edible mutual binder for said nut meats and a subsequently applied candy coating and then applying a heated aqueous candy forming syrup coating to a mixture of puffed cereal particles and said pre-coated nut meats and uniformly mixing said ingredients to distribute the syrup.

2. The process of claim 1 wherein the mutual binder is an edible vegetable gum.

3. The process of claim 1 wherein the mutual binder is a polyhydroxy ester of a fatty acid.

4. The method of forming a candy coated substantially non-segregating mixture of nut meats and puffed cereal particles which comprises pre-coating the nut meats with a solution of an edible mutual binder for said nut meats and for a subsequently applied candy forming syrup; drying them to remove the solvent from said solution, and then applying a heated aqueous candy-forming syrup coating to a body of puffed cereal particles and said pre-coated nut meats while mixing them to substantially uniformly distribute said particles and to coat them with said syrup, and cooling the mixture to recover a substantially homogeneous candy coated mixture of cereal and nut meats particles.

5. The method of claim 4 which comprises further admixing with said nut meats and puffed cereal particles after addition of said syrup a separately formed candy coated puffed cereal.

References Cited by the Examiner
UNITED STATES PATENTS

| | | | |
|---|---|---|---|
| 1,025,326 | 5/12 | Speck | 99—80 X |
| 2,278,466 | 4/42 | Musher | 99—82 X |

A. LOUIS MONACELL, *Primary Examiner.*

RAYMOND N. JONES, *Examiner.*